Figure 1:
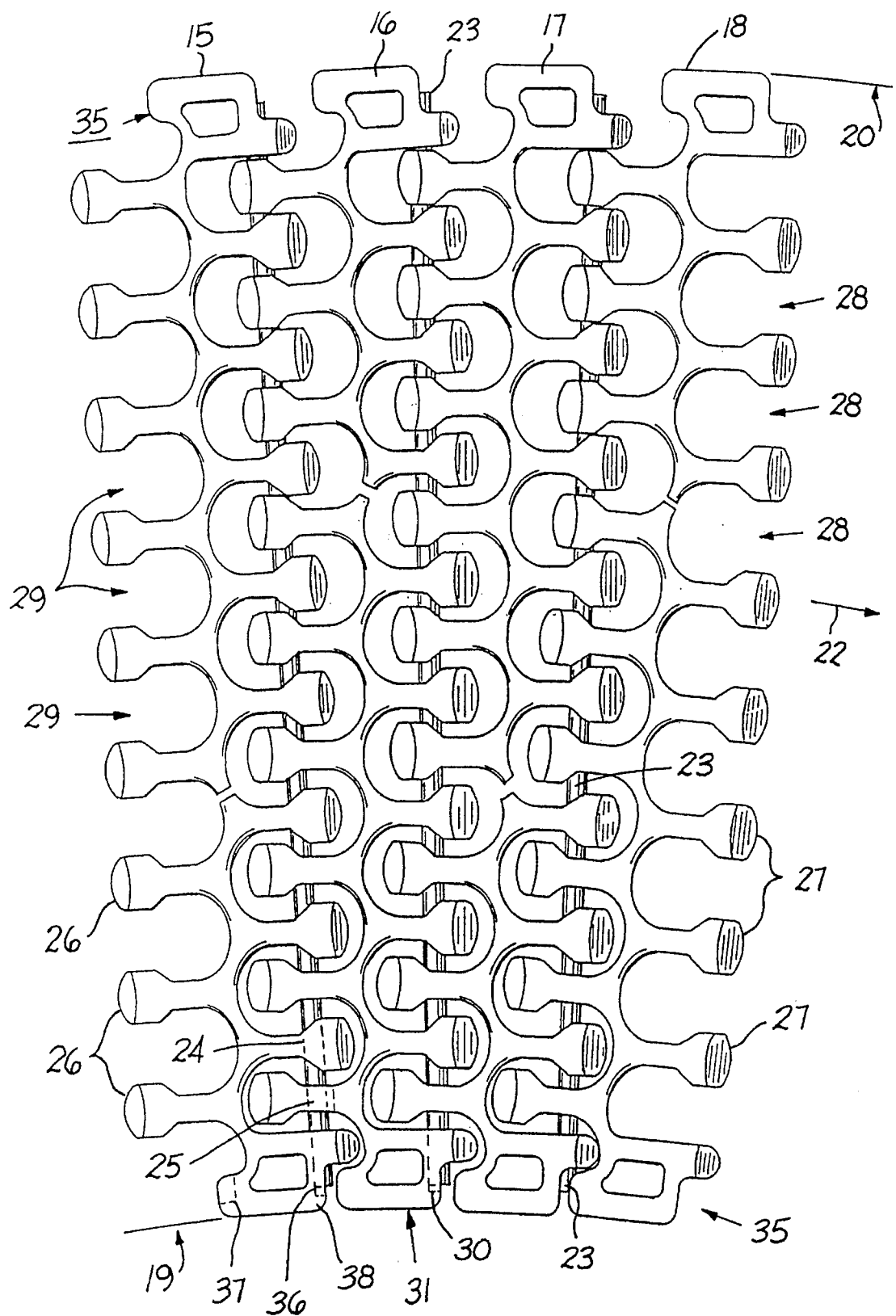

United States Patent [19]
Horton et al.

[11] Patent Number: 5,598,916
[45] Date of Patent: *Feb. 4, 1997

[54] CHANGING HEADLESS PIVOT RODS FROM EDGES OF MODULAR CONVEYOR BELTS

[75] Inventors: Paul L. Horton; Christopher J. Verdigets, both of Metairie, La.

[73] Assignee: The Laitram Corporation, La.

[*] Notice: The term of this patent shall not extend beyond the expiration date of Pat. No. 5,372,248.

[21] Appl. No.: 351,528

[22] Filed: Dec. 7, 1994

Related U.S. Application Data

[63] Continuation-in-part of Ser. No. 184,501, Jan. 18, 1994, Pat. No. 5,372,248.

[51] Int. Cl.$^6$ ................................................. B65G 17/06
[52] U.S. Cl. ................................................................ 198/852
[58] Field of Search ........................................ 198/851–853

[56] References Cited

U.S. PATENT DOCUMENTS

| | | | |
|---|---|---|---|
| 4,972,942 | 11/1990 | Faulkner | 198/853 |
| 5,058,732 | 10/1991 | Lapeyre | 198/852 |
| 5,332,084 | 7/1994 | Greve | 198/853 |
| 5,372,248 | 12/1994 | Horton | 198/852 |

Primary Examiner—David A. Bucci
Attorney, Agent, or Firm—Laurence R. Brown; James T. Cronvich

[57] ABSTRACT

Modular conveyor belt links have edge structure for occluding exit of pivot rods from the edge of the belt during operation of conveyor belts formed from pivotably connected end-to-end links. The links feature belt edge structure with an outer pivot rod entry aperture offset from the axis of aligned link end pivot rod holes in one set of link ends thereby forming a pivot joint axis. When the pivot rod is forced from the belt edge into the offset aperture and headed toward the pivot joint the plastic link is elastically deformed enough to permit entry of the rod. For example, an occlusion barrier wall disposed near the belt edge retains the rod in the pivot joint. A matrixing nest for the end of the pivot rod resident in its axial joint site is formed in the link material. From this nest the rod can be removed only by forced distortion of a rod end by a force greater than those forces encountered in the course of normal belt operation. Various embodiments are permitted by offset aperture and nesting structure that afford functional advantages in belt performance.

29 Claims, 4 Drawing Sheets

CHANGING HEADLESS PIVOT RODS FROM EDGES OF MODULAR CONVEYOR BELTS

This application is a continuation-in-part of the application 08/184,501 filed Jan. 18, 1994, now U.S. Pat. No. 5,372,248 by Paul L. Horton for RADIUS CONVEYOR BELT.

TECHNICAL FIELD

This invention relates to modular plastic link conveyor belts having modules interconnected by headless pivot rods and more particularly it relates to integral stationary modular link construction accessibly disposed at belt edges for entering and removing pivot rods while occluding pivot rod axial movement out of the belt edge during stresses of belt operation.

BACKGROUND ART

In the prior art, headless pivot rods have been retained in place in pivot sites of modular link belts by various structures either integral with the modular belt links or affixed thereto. However prior art structures have introduced operational problems and have not proved reliable under some conditions encountered in the normal expected conditions encountered in belt operation. For example movable end caps that may be bent out of the way are subject to fracture or vibration under certain belt operating conditions. Non-integral link attachments may become dislodged to permit rods to exit the belt edges and/or may cause catastrophic belt failures. Furthermore they require manufacturing and stocking of additional belt parts beyond belt links and rods.

It is to be realized that articulation of the belt around sprockets and other operating conditions can lead to vibration and chatter of a rhythmic nature and regionally distributed stresses and forces in end-to-end connected modular links under load that induce pivot rods to move axially out of their pivot sites to extend through the belt edge causing belt failure. Furthermore, smaller diameter and more flexible plastic pivot rods are subject to wear and strain under loading and tension conditions that reduces optimum performance over time and are subject to replacement from time to time as a matter of failure or preventive maintenance. Thus, inconsistent requirements of expediting pivot rod replacement and reliably occluding the rods into their pivot sites are placed upon pivot rod retention structure.

Any pivot rod retention system that requires flexibility of the pivot rods not only precludes the use of metallic rods such as steel, but also may compromise desired long wear and heavy belt load capacity by required use of excessively flexible rods.

Thus, it is an objective of this invention to provide an improved pivot rod retention system that resolves these prior art deficiencies.

A more particular objective of this invention is to provide a pivot rod retention system integrally formed as a resident stationary part of the modular plastic links from which modular conveyor belt systems are constructed.

U.S. Pat. No. 5,332,084, C. G. Greve, Jul. 26, 1994 to some extent resolves the foregoing prior art problems and provides a resident stationary part of the link as an entry guide for flexible plastic rod that must bend for insertion at a belt edge entry position. However, under certain belt operating conditions, for example, where vibration of the unsupported ends of the pivot rod may be induced, the rod may escape the rather small area crescent shaped occlusion member retaining the rod from leaving the edge of the belt.

In U.S. Pat. No. 4,972,942, W. G. Faulkner, Nov. 27, 1990, an edge guard is attached to one side of a link from which a pivot rod extends to prevent interference and to occlude the pivot rod preventing it from passing through the edge guard. To enter or remove a pivot rod from the belt edge it is required to provide elongated pivot rod apertures in all the interdigitated link ends to provide a significant amount of movement of two end-to-end modules toward each other. Thus, the pivot rods may not be removed or introduced from the edge of a belt in normal conveyance position in the field without introducing slack such as by removing the belt from its drive sprockets. Furthermore with the longitudinal shaped apertures in both link ends the pivot rod can introduce impact stresses and have excessive lateral mobility including skewing to positions non-normal to the belt edge under certain operating conditions.

Accordingly it is an object of this invention to provide improved pivot rod occlusion structure at the edge of the belt that facilitates changing of pivot rods and which reliably occludes the pivot rod and retains it in a pivot site in a normally disposed position from the belt edge.

Further it is an object of this invention to provide a greater range of reliability in retention of headless pivot rods by resident stationary occlusion structure integrally formed in the link which permits a wide range of pivot rods from flexible plastic to stiffened steel construction to be readily entered or removed from an edge of an unloaded belt disposed in operational condition in the field.

DISCLOSURE OF THE INVENTION

This invention relates to the feature of retaining headless pivot rods within the outer edges of a modular plastic link belt. The outer edges of the belt are thus formed by edge module members with occlusion structure permitting entry and removal of pivot rods. The occlusion structure functions both to occlude the pivot rods and to retain the rods in-situ within a resident pivot joint site disposed normally to the belt edge or longitudinal travel path. One feature of the invention is found in several embodiments having the common structure of an indented pivot rod end nest formed in the modular link plastic body for retaining the ends of the in-situ pivot rod transversely disposed in the end-to-end coupled belt configuration.

A preferred embodiment of the invention provides for a special link end construction at the belt edge of a module providing for at least one offset aperture through which the pivot rod enters its resident pivot joint site. The offset aperture comprises occlusion structure for retention of the pivot rod inwardly from the belt edge. These offset apertures and accompanying occlusion members may reside either in a link edge structural member integrally formed in general alignment with pivot rod apertures axially aligned in two oppositely extending interdigitatable link end sets, or may be distributed between the link edge structure and the link end sets.

Further objects, features and advantages of the invention will be found throughout the following description and claims taken together with the appended drawings.

BRIEF DESCRIPTION OF THE ACCOMPANYING DRAWINGS

Figure 1A:
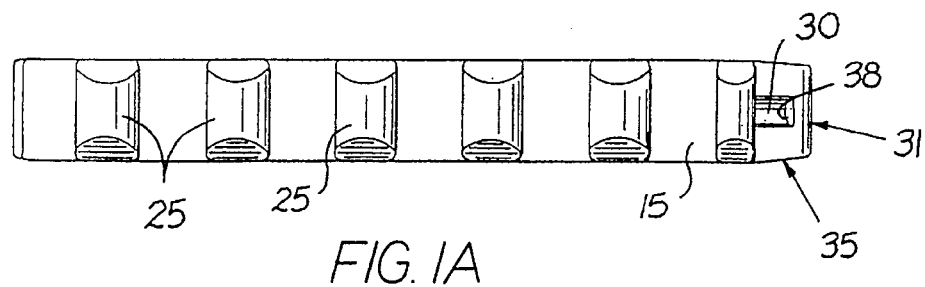
Figure 1B:
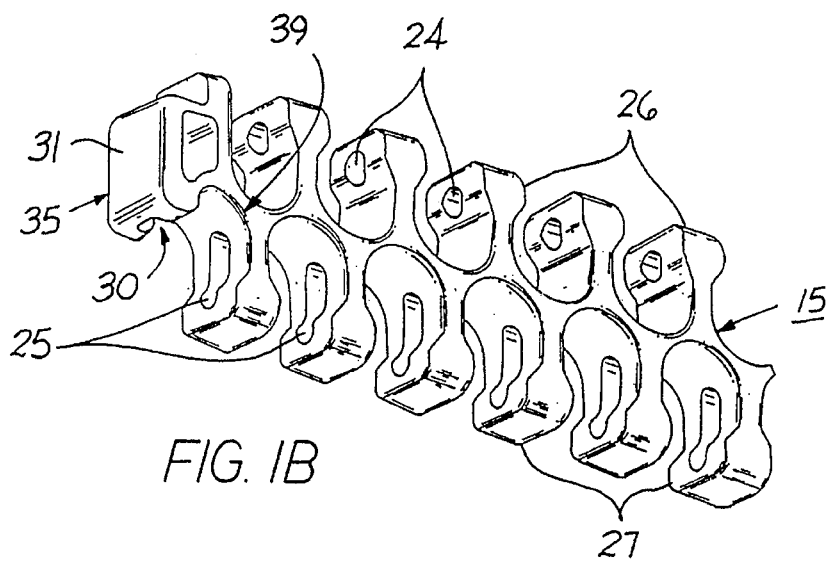

In the accompanying drawings, wherein like reference characters refer to similar features in the several views to facilitate comparison:

FIGS. 1, 1A and 1B are respectively: a plan view portion of a modular link plastic conveyor belt passing about a curve; a plan view of one end of a link showing a pivot rod nest indented in the plastic body; and a perspective view of a link fragment showing a set of elongated pivot hole apertures in one set of link ends, all relating to a first embodiment of the invention.

Figure 2:
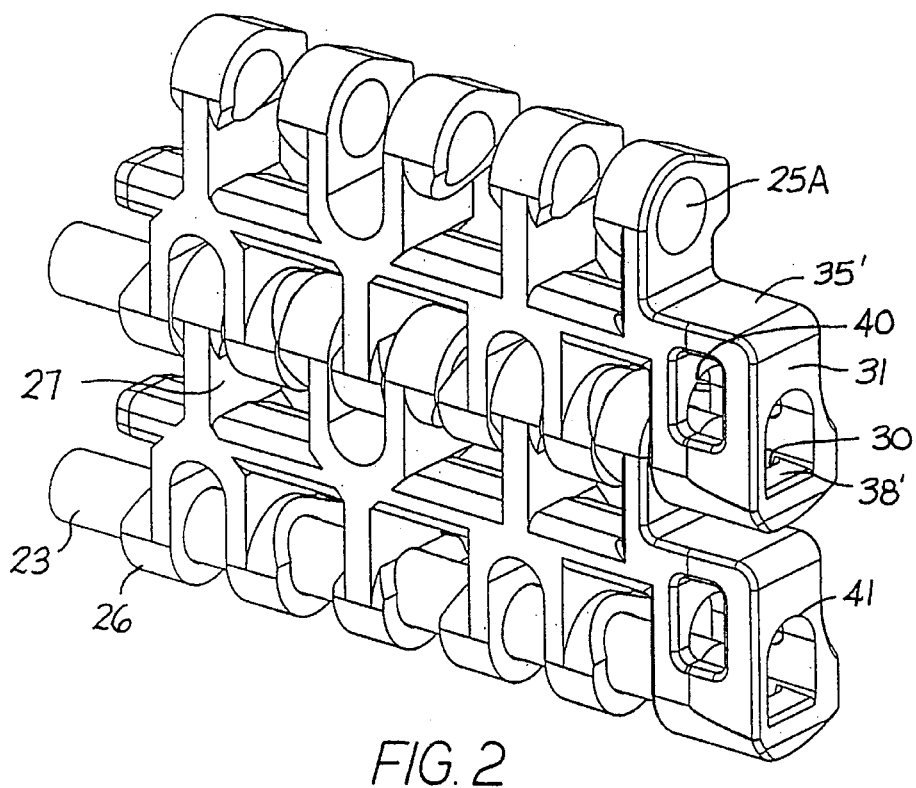
Figure 2A:
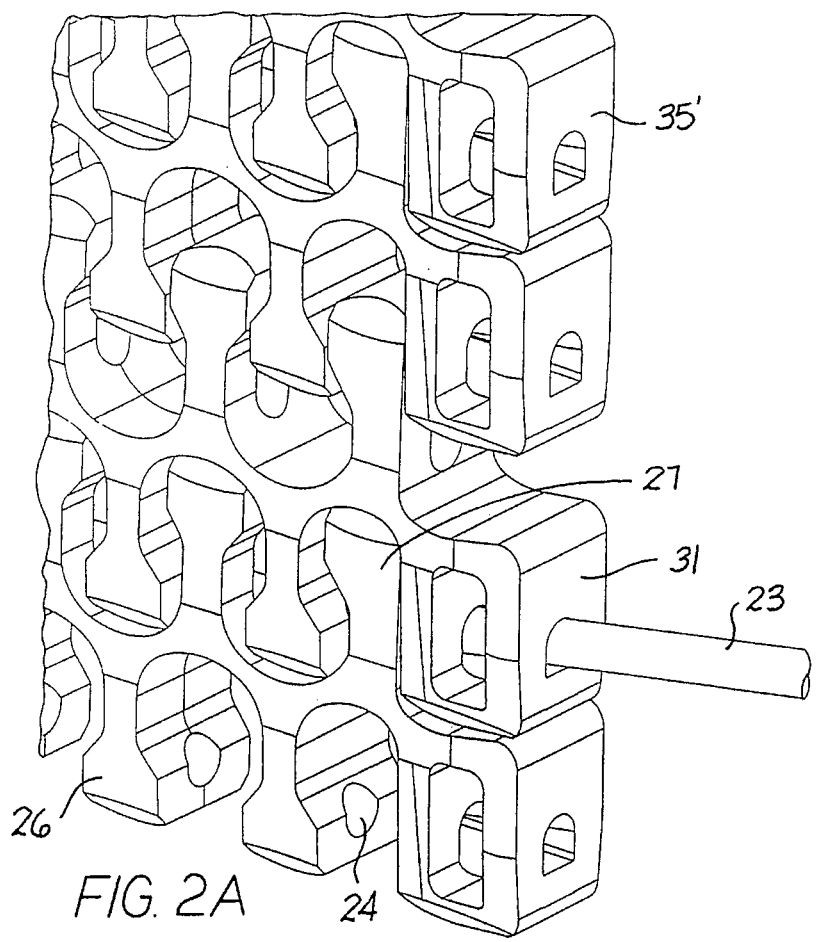
Figure 2B:
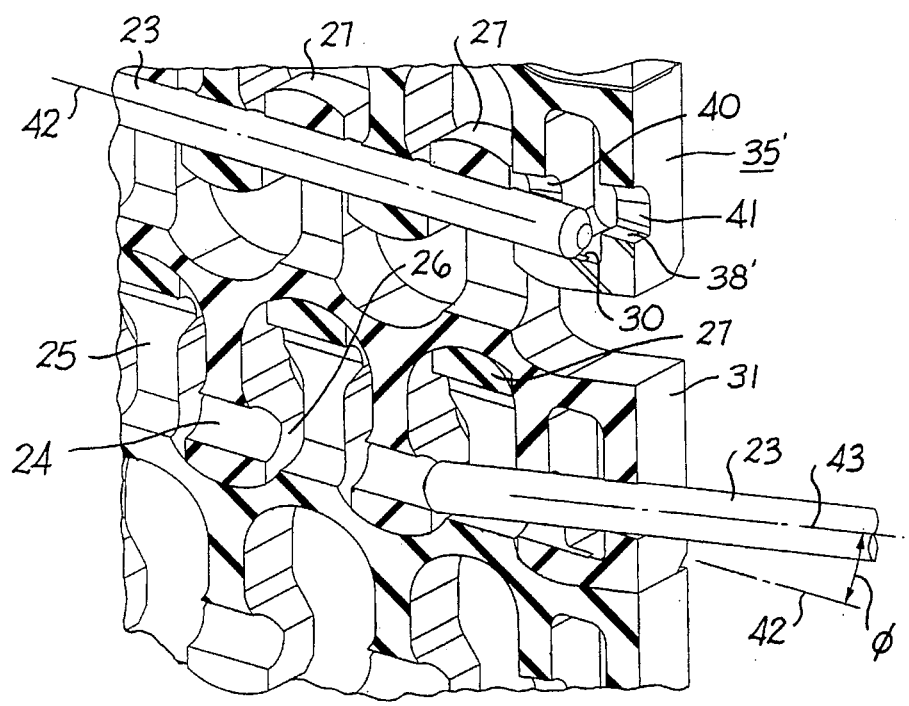

FIGS. 2, 2A and 2B are respectively: a perspective fragmental view of a conveyor belt showing a flush belt edge portion; a perspective fragmental sketch similar to FIG. 2 showing the insertion of the pivot rod from the belt edge; and a perspective fragmental view in section showing the entry of the pivot rod and its in-situ position in the pivot joint, all relating to a second embodiment of the invention.

Figure 3:
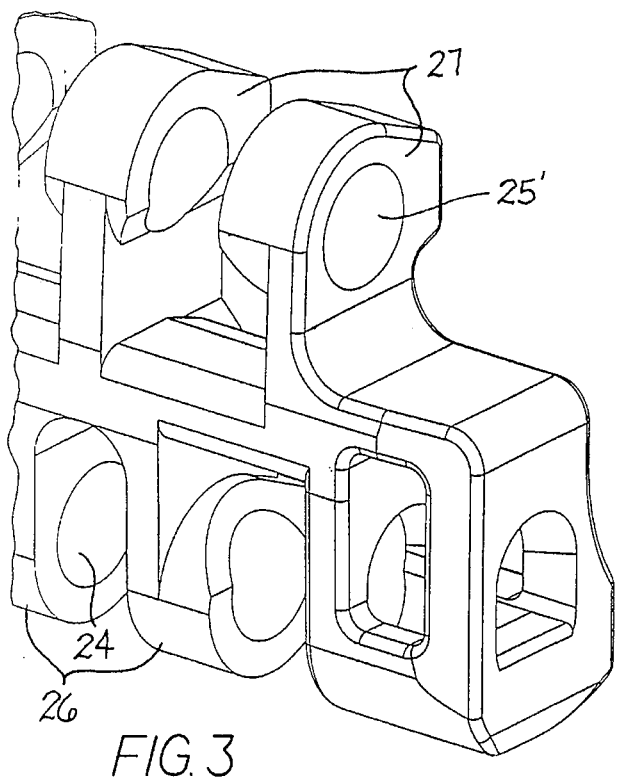
Figure 3B:
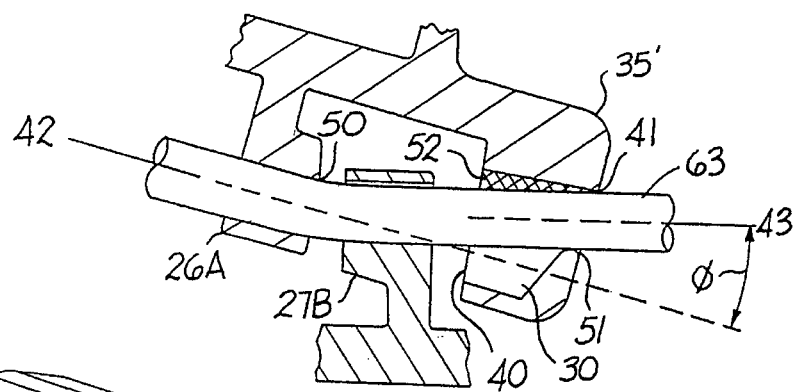
Figure 3A:
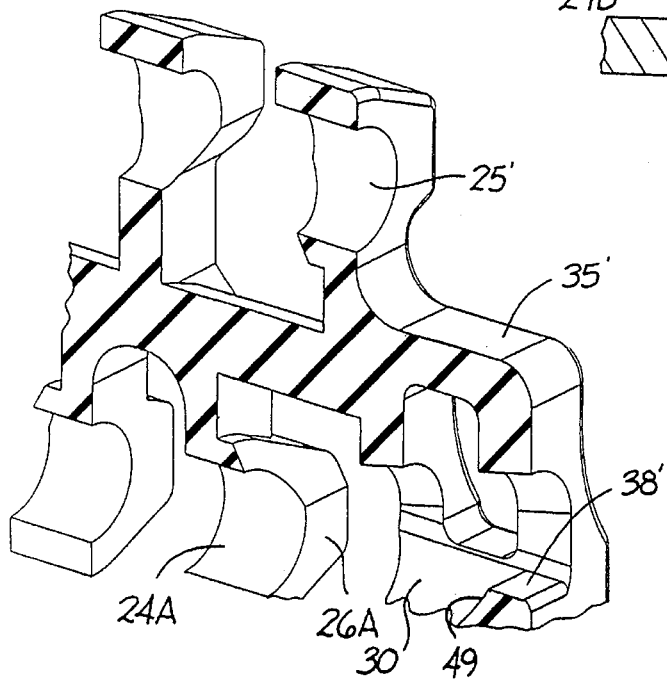

FIGS. 3, 3A and 3B are respectively an enlarged belt edge perspective fragment of the modular link of FIG. 2; a section view of FIG. 3; and a generalized side view sketch in section view showing occlusion structure in the region of the belt edge permitting the passage of the pivot rod through link end apertures near the conveyor belt edge.

THE PREFERRED EMBODIMENTS

Now with reference to the first embodiment of FIGS. 1, 1A and 1B, the plastic modular conveyor belt links or modules 15 to 18 are connected end-to-end in a portion of a conveyor belt that passes about curved travel paths such as shown by the inner and outer arcs 19, 20. The modules are interconnected end-to-end along the belt, which moves in, or opposite to, the direction of the arrow 22 by means of headless cylindrical plastic or steel pivot rods 23 passed through two sets of apertures 24, 25 respectively in corresponding sets 26, 27 of interdigitating link ends disposed on opposite ends of the modules. The male link ends of the respective sets 26, 27 respectively mate into the female notches 28, 29 of adjacent end-to-end coupled modular links 15, etc. The pivot rods 23 are disposed to reside in an axial pivot site normally disposed to the inner and outer edges of the conveyor belt and the general direction of belt travel 22. The pivot rods 23 are retained in place so that they do not extend beyond the belt edges by means of abutment walls near the belt edge 31 defined by indented nests 30 formed in the links and aligned with the pivot site axis along the length of any one of the pivot rods 23, in this first embodiment of the invention.

The sets of link end fingers 26 and 27 are generally similar on the respective link ends except for an edge link end configuration 35 in the region of at least one belt edge 31. This edge link end member 35 forms the nest 30 for receiving the end portion of pivot rods 23 in-situ as retained in the pivot joint site with a linear axis through the respective apertures 24, 25, 26 in the link ends 26, 27 of end-to-end connected modules 15, 16, etc. along a pivot axis substantially normal to the edge 31 of the belt. The pivot rod length permits it to slide axially in the pivot site and rod end nests 30 a limited distance under normal conditions of belt movement and loading. The nest indentation 30 is preferably cylindrical in shape to serve as a matrixing receptacle for the cylindrical end of pivot rod 23. A wall 38 at the end of the nest 30 and adjacent the edge of the belt 31 defines occlusion means for limiting the axial motion of the rod as a barrier that prevents the rod 23 from exiting the belt edges during belt operation. In this version, the barrier wall 38 forms a segment no larger than a semicircle mating with the end of pivot rod 23. The segment size is chosen as a compromise between the reliability of rod retention under limiting conditions of belt operation and the difficulty in forcing pivot rods into and out of the resident pivot joint position when a pivot rod is to be changed.

The link end structure 35 may be at one or both edges of the belt, so that the pivot rods 23 can be removed from one or both belt edges. As later discussed, the occlusion wall 38 preferably has a slanted ramp for the purpose of permitting a pivot rod 23 to be forcefully removed over the occlusion wall 38. Thus a surface on the barrier wall provides a slide over which the pivot rod is passed as it is forced into its aligned axial position in the pivot joint through the apertures 24, 25. In the event that the pivot rod 26 is steel or otherwise formed of a stiff material, the plastic of the module will elastically deform enough to permit the rod 23 to enter or exit the pivot joint. Thus, although the plastic material is in general stationary, it is not made to readily bend or flex out of position under normal belt operating conditions. The thin bridging arm 39 for example may be forced elastically by the rod to deflect enough for entry of a stiff rod without bending the rod. However, if a more flexible plastic rod is used the entry may result from a combined elastic deformation of both the rod and the link plastic material. The rod 23 when entered from the edge of the belt is disposed at an acute angle to the linear pivot axis of the apertures 24, 25 and nest 30 which defines the pivot joint.

This embodiment has the advantage of a simple easy to mold edge link structure 35 which is not really a link but a belt edge member presenting a straight flat belt edge bearing surface. Also the edge member 35 is dimensioned in this embodiment to provide the indented nest 30 in axial alignment with the apertures 25. These apertures 25 are oblong to permit a limited degree of play or slack for skewing of the pivot axes of adjacent end-to-end connected modules 15–16, etc. when the belt passes around curves such as represented by arcs 19, 20. At the inner curvature arc 19 it is noted that the link edge members 35 of end-to-end coupled links may abut. Thus the nest indentations 30 are disposed into both leading 36 and trailing 37 ends of the link edge members 35. The rod 23 is confined with the rod axially in place within the confines of the nest 30 when the rod 23 is fully entered. This is advantageous to damp vibration that would result in freely hanging rod ends found in prior art pivot joints. The barrier wall 38 serves as an outer bearing surface as the rod 23 enters the belt from the edge 31 at an acute angle with the axis of the resident pivot joint position. The outer end of pivot rod 23, as seen about arc 20 is thus exposed for access for removal and entry because of the lack of apertures in the link edge structure 35 of this embodiment.

Different link end structure 35' is provided upon the second embodiment of FIGS. 2, 2A and 2B. Thus, inner 40 and outer 41 apertures are formed in the link end member 35' with the nest 30 disposed therebetween. The occlusion wall 38' is formed about the outer aperture 41, which is offset from the pivot rod axis 42. Thus the acute angle $\phi$ of entry of the pivot rod 23 along its entry axis from the resident pivot joint axis 42 results from the offset aperture 41. The rod in its pivot joint resident position is confined in the axially aligned circular apertures 24 in the link ends, reached after entering offset outer aperture 41, passing through the tapered and elongated inner aperture 40 and passing through the respective aperture 25 or 25A in link end 27 of the adjacent module. In FIG. 2 aperture 25A is circular, and in FIGS. 2A and 2B it is elongated. The elongated aperture 25 permits the embodiments of FIGS. 2A and 2B to pass around curves.

Accordingly this embodiment has the pivot rod entry aperture 41 offset from the pivot axis 42 for receiving and directing the pivot rod into the pivot joint by entry from the edge 31 of the belt at an acute angle φ with the pivot axis 42 for lodging the pivot rod 32 into the pivot joint site with the ends of the pivot rod nested in the nest 30 aligned with the pivot axis. The offset pivot rod entry aperture 41 is defined by link end wall 38 providing occlusion means for restricting linear movement of the pivot rod 23 in said pivot joint site thus occluding the headless pivot rod from exiting the link at the belt edge 31 under conditions encountered during normal belt movement and loading.

The pivot rod thus slides over the inner surfaces of the two spaced apertures 40, 41 in the link end member 35' and the initial link end aperture 24 or 25A as the case may be for the FIG. 2 and 2B variations to enter its resident pivot joint site. In that site, as may be viewed in FIG. 2B, a significant advantage of the headless pivot rod occlusion system of this invention is that the link end fingers 27 under belt load conditions pull the pivot rod 23 more securely into the nest 30 to forcefully reinforce the nesting feature as exhibited in the slack belt condition without loading tension. Thus, the nest 30 is placed in the link end structure 35' in a position to receive the pivot rod in the loaded belt tension condition, yet being confined in its pivot joint site by the circular apertures 24 of the set of link ends 26 provides reliable occlusion by means of barrier wall 38' under all conditions of belt operation. While the nest may have other configurations approximating a cylindrical surface, it is desirable to have a close fitting relationship with the nest and rod ends to damp any tendency for vibration or chatter caused during belt operation.

In the enlarged views of FIGS. 3 and 3A, the internal aperture and nest structure of the link end structure 35' will be better seen for the version of link having circular apertures in both sets of link end fingers 26 and 27. In this embodiment it can be noted that the barrier wall 38' of the nest 30 has a tapered ramp 49 angled from the pivot axis for the purpose of expediting the exit of the pivot rods from the resident pivot site. This is particularly desirable if the link end finger 25' of a lower module has the circular aperture to receive and guide the pivot rod entry when dispersed between the adjacent link edge structure 35' and link end finger 27A, thus providing a shortened longitudinal distance over which the plastic material is elastically deformed in response to entry of the pivot rod 63.

As seen from FIG. 3B, in order for the pivot rod 63 to bend away from the pivot joint site axis 42 upon entry or exit, it is evident that the plastic material coupled to at least link end 26A and link edge structure 35' may be elastically deformed by forcing of the rod 63 into or out of the pivot joint site. Bearing surfaces 50 and 51 on the link end 26A and the outer side of the link edge structure 35' contact the rod 63 during entry and exit. Because the dimensions of the inner aperture 40 are greater than the diameter of the rod 63, the walls of the inner aperture provide no bearing surface intermediate to the two spaced apart bearing surfaces 50 and 51 that would severely increase the bend angle φ between the pivot axis 42 and the rod entry axis 43 and make it difficult to insert and remove rods. Interdigitated link end 27B and its associated module can be flexed or otherwise taken out of its normal running position to facilitate rod entry or exit. To further aid rod entry, the link edge structure 35' can include a guide ramp 52 positioned between the inner aperture 40 and the offset outer aperture 41 and canted at approximately the angle φ from the pivot rod axis 42 to guide the rod 63 on entry without undue deflection. Other variations may be made without departing from the spirit and nature of the invention which is set forth with particularity in the following claims.

We claim:

1. In a modular conveyor belt with interconnected end-to-end modules having respective pluralities of interdigitated male link ends mating into female notches disposed between the link ends and pivotably held together between two belt edges by a cylindrical pivot rod headless at two ends retained to reside in a pivot site normally disposed to the longitudinal direction of belt travel, the improvement for receiving and retaining the pivot rod in place comprising in combination:

link end structure on the modules disposed with a plurality of pivot holes formed in the link ends arranged to retain the pivot rod in a pivot joint site along a stationary linear pivot axis normally disposed to the belt and passing through the link ends of two end-to-end modules thereby forming a pivot joint between modules, an additional edge link end configuration in the region of at least one belt edge having pivot rod entry structure offset relative to said pivot rod for receiving and directing the pivot rod into the pivot joint by entry from the edge of the belt at an acute angle to the linear pivot axis for lodging the pivot rod into said pivot joint site along the pivot axis, said offset pivot rod entry structure comprising a link end wall forming occlusion means for restricting linear movement of a pivot rod inserted into said pivot joint site thus preventing the headless pivot rod from exiting the link at the belt edge under conditions encountered during normal belt movement and loading and further comprising means for encompassing and supporting at least part of an in-situ normally disposed headless pivot rod end.

2. The improvement of claim 1 further comprising a stiff pivot rod and plastic modules which elastically deform in response to the entry of the pivot rod sufficient to permit sliding entry of the pivot rod through the edge link end over the occlusion means to enter the resident pivot site position.

3. The improvement of claim 1 further comprising a plastic pivot rod exhibiting elasticity for bending in the region between the offset link end aperture and the resident pivot joint site when the pivot rod is inserted into the belt from a belt edge.

4. The improvement of claim 1 further comprising means with elongated oval shaped pivot holes in link ends of only one set of link ends at a respective end of the link for enabling said belt to pass around a curved belt path.

5. The improvement of claim 4 wherein the modular conveyor belt comprises side-by-side modules positioned across the belt, and the oval shaped pivot holes of said set are disposed in all of the link ends of the side-by-side modules extending across the belt between opposite belt edge link ends, thereby permitting a limited degree of slack between two end-to-end coupled modules in the direction of the belt travel thereby permitting the belt to pass around a curved belt path.

6. The improvement of claim 1 further comprising a belt edge link end configuration having integral structure defining two spaced apertures serving as guides for entry of the pivot rod from the edge of the belt into the pivot joint site.

7. The improvement of claim 1 wherein the means for encompassing and supporting the pivot rod end further comprises, pivot rod end nesting structure indented in the additional link end configuration and resident inwardly from the occlusion means to receive and nest the pivot rod end when disposed in a pivot site along said pivot axis.

8. The improvement of claim 7 further comprising:
said pivot holes in one module disposed for the pivot rod disposed to engage link ends of an adjacent end-to-end module under tension from belt loading toward the nesting structure to seat the pivot rod end forcefully in the nest thereby reinforcing the occlusion of the pivot rod in the pivot joint site.

9. The improvement of claim 7 wherein said nesting structure comprises a cylindrical depression in the edge link structure for mating with the pivot rod near the belt edge, said nesting structure defining said occlusion means by a barrier surface positioned at an outermost end of the nest to occlude movement of a headless end of the pivot rod out of the edge of the belt.

10. The improvement of claim 9 wherein said barrier surface comprises a wall formed at the outer end of the nesting structure in the region of the belt edge, said wall being angularly disposed from the pivot joint axis.

11. The improvement of claim 9 wherein the barrier surface comprises a rim wall adjacent said belt edge.

12. The improvement of claim 7 wherein a single belt edge link end has two spaced apart pivot rod entry apertures and said nesting structure is disposed substantially the distance between the two spaced apart pivot rod entry apertures.

13. The improvement of claim 7 wherein the nest is disposed to receive the pivot rod forced thereinto under load conditions with the belt in tension thereby to better secure the rod from exiting the edge of the belt.

14. The improvement of claim 7 further providing in said occlusion means: means for resisting movement of the pivot rod through the nesting structure out the edge of the link with a surface disposed at an angle for expediting removal of a rod nested in its pivot joint position from the edge of the link.

15. The improvement of claim 14 wherein the occlusion means surface further comprises a ramp directed toward the offset pivot rod entry structure.

16. The improvement of claim 1 wherein the occlusion means structure further comprises a ridge that subtends a segment of the pivot rod smaller than a semi-circle.

17. The improvement of claim 1 wherein an enlarged pivot hole of an interdigited link end is interspersed between the pivot rod entry structure and a link end pivot hole for engaging a pivot rod end region in the pivot joint site.

18. The improvement of claim 1 wherein said edge link configuration on the belt edge forms a straight edge structure.

19. The improvement of claim 1 wherein said pivot holes and edge link end configuration on one end of the link keep the pivot pin confined in said pivot joint site, wherein the link end configuration in the vicinity of the link edge defines two spaced apart surfaces for receiving the rod in a sliding relationship as the rod is inserted from the edge of the link.

20. The improvement of claim 19 wherein the link ends at only one of the opposite ends of the link have oval shaped apertures to permit a limited degree of movement back and forth between adjacent end-to-end coupled links in the direction of belt travel wherein said two pivot rod sliding contact surfaces are provided in link ends straddling one of the oval shaped apertures.

21. The improvement of claim 19 wherein the two spaced apart surfaces are in a single link end at the edge of the link.

22. In a modular conveyor belt with interconnected end-to-end modules having respective pluralities of interdigitated male link ends mating into female notches between the link ends of adjacent end-to-end modules and pivotably held together between two module ends by a cylindrical pivot rod headless at two ends, the improvement for receiving and retaining the pivot rod in place comprising in combination:

link end structure on the modules disposed with a plurality of pivot rod receiving apertures formed in the link end structure arranged along a linear axis through the link ends of two end-to-end connected modules for receiving the pivot rod to form a pivot joint between modules, sets of said link ends at respective link end structure locations being of configuration to permit axial movement of a pivot rod except for the vicinity of an edge link end wherein an indention in the link body forms a nest indentation for engaging a substantially cylindrical surface portion of a headless pivot rod end thereby supporting an end portion of said pivot rod in-situ by its cylindrical surface portion to retain the pivot rod in a pivot joint site with a linear pivot axis normal to the edge of the belt, said nest permitting the rod to slide axially therein a limited distance under normal conditions of belt movement and loading, said nest comprising occlusion means in the region of the belt edge for limiting axial motion of the rod and preventing the rod from exiting the belt edges during belt operation.

23. The improvement of claim 22 wherein said occlusion means is defined by structure at one end of the nest.

24. The improvement of claim 22 wherein said occlusion means further comprises a wall for occluding the headless end of a pivot rod, said wall presenting a surface over which the pivot rod is directed at an acute angle with said linear pivot axis from the edge of the belt to enter and reside in the pivot joint.

25. The improvement of claim 24 further comprising a contour on said wall surface permitting the pivot rod to be removed forcibly from the edge of the belt.

26. The improvement of claim 22 wherein the link end structure has a single link end pivot rod receiving aperture spaced inwardly from said occlusion means to guide the pivot rod into a pivot joint resident position in said nest.

27. The improvement of claim 22 wherein the nest indentation is shaped substantially as a segment of a cylinder no greater than a semi-cylinder.

28. The improvement of claim 22 wherein one set of link ends has oval shaped pivot apertures permitting links to pass about curves presenting an inner curvature arc where two interconnected link edge ends abut at the edge of the belt, further comprising provided face-to-face indentations on the abutting link edge ends that nest respective circumferential portions of the pivot rod end.

29. The improvement of claim 22 where the belt edge has apertured link end structure positioned inwardly of the belt edge whereby two end-to-end connected modules are pivotably disposed to expose the pivot rod for removal and entry thereof axially from the nest.

* * * * *